(12) United States Patent
Schmiedeknecht (10) Patent No.: US 12,116,830 B2
(45) Date of Patent: Oct. 15, 2024

(54) PROFILE FOR A WINDOW AND/OR DOOR PART WITH METAL LAYER

(71) Applicant: Salamander Industrie-Produkte GmbH, Tuerkheim (DE)

(72) Inventor: Till Schmiedeknecht, Munich (DE)

(73) Assignee: Salamander Industrie-Produkte GmbH, Tuerkheim (DE)

( * ) Notice: Subject to any disclaimer, the term of this patent is extended or adjusted under 35 U.S.C. 154(b) by 690 days.

(21) Appl. No.: 17/214,213

(22) Filed: Mar. 26, 2021

(65) Prior Publication Data

US 2021/0301586 A1 Sep. 30, 2021

(30) Foreign Application Priority Data

Mar. 27, 2020 (DE) .......................... 102020108576.1

(51) Int. Cl.
| | | |
|---|---|---|
| *E06B 3/00* | (2006.01) | |
| *B29D 99/00* | (2010.01) | |
| *B32B 7/12* | (2006.01) | |
| *B32B 15/08* | (2006.01) | |
| *B32B 15/20* | (2006.01) | |
| *B32B 37/00* | (2006.01) | |
| *B32B 37/06* | (2006.01) | |

(Continued)

(52) U.S. Cl.
CPC .......... *E06B 3/306* (2013.01); *B29D 99/0003* (2013.01); *B32B 7/12* (2013.01); *B32B 15/08* (2013.01); *B32B 15/20* (2013.01); *B32B 37/0053* (2013.01); *B32B 37/06* (2013.01); *B32B 37/1207* (2013.01); *E06B 3/22* (2013.01); *B29C 48/12* (2019.02); *B32B 2037/1215* (2013.01); *B32B 2255/06* (2013.01); *B32B 2255/205* (2013.01); *B32B 2255/26* (2013.01); *B32B 2309/02* (2013.01); *B32B 2309/105* (2013.01); *B32B 2311/00* (2013.01); *B32B 2419/00* (2013.01)

(58) Field of Classification Search
CPC ....... B32B 15/20; B32B 7/12; B32B 2255/06; B32B 2255/205; E06B 3/306
See application file for complete search history.

(56) References Cited

U.S. PATENT DOCUMENTS 5,620,648 A * 4/1997 Volkmann ............. B29C 70/763
    264/254
6,659,020 B1 * 12/2003 Ball ......................... B32B 5/18
    108/57.28

(Continued)

FOREIGN PATENT DOCUMENTS

DE    4343468 A1    6/1995
DE    19734873 A1    2/1999

(Continued)

OTHER PUBLICATIONS

German action dated Jan. 20, 2021, Application No. 10 2020 108 576.1.

(Continued)

*Primary Examiner* — Basil S Katcheves
(74) *Attorney, Agent, or Firm* — Banner & Witcoff Ltd.

(57) ABSTRACT

A profile (e.g. an extrusion profile such as a monoextrusion or co-extrusion profile), for a door and/or window part may include a metal layer of less than 1.0 mm thickness laminated at least partially to an outer side of the profile using an adhesive.

19 Claims, 4 Drawing Sheets

(51) Int. Cl.
  *B32B 37/12*  (2006.01)
  *E06B 3/22*   (2006.01)
  *E06B 3/30*   (2006.01)
  B29C 48/12    (2019.01)

(56) References Cited

U.S. PATENT DOCUMENTS

| | | | |
|---|---|---|---|
| 2005/0166527 A1* | 8/2005 | Ernest | E04F 19/0495 |
| | | | 52/716.1 |
| 2007/0137119 A1* | 6/2007 | Guillemette | E06B 3/306 |
| | | | 52/204.1 |
| 2011/0016796 A1* | 1/2011 | Foster | B29C 44/1209 |
| | | | 49/477.1 |
| 2013/0000232 A1* | 1/2013 | Weiss | B32B 17/10055 |
| | | | 52/656.1 |
| 2015/0202844 A1* | 7/2015 | Boger | B32B 15/20 |
| | | | 156/308.2 |
| 2015/0308181 A1* | 10/2015 | Wagner | E06B 3/306 |
| | | | 72/46 |
| 2017/0167030 A1 | 6/2017 | Kluppel et al. | |
| 2018/0252019 A1* | 9/2018 | Myers | E06B 1/12 |

FOREIGN PATENT DOCUMENTS

| | | |
|---|---|---|
| DE | 102014108671 A1 | 10/2015 |
| DE | 202016106882 U1 | 1/2017 |
| EP | 0638368 B1 | 8/1997 |

OTHER PUBLICATIONS

European extended search report dated Aug. 19, 2021, Application No. 21163583.4.

* cited by examiner

PROFILE FOR A WINDOW AND/OR DOOR PART WITH METAL LAYER

CROSS REFERENCE TO RELATED APPLICATIONS

This patent application claims priority to German Patent Application No. 10 2020 108 576.1, filed Mar. 27, 2020, which is incorporated herein by reference in its entirety.

BACKGROUND

Field

The present disclosure relates to a profile, in particular an extrusion profile, monoextrusion or co-extrusion profile, for a window and/or door part, in particular a window and/or door frame part or a window and/or door leaf part, and to a method for producing such a profile.

Related Art

In the prior art, it is known to increase the attractiveness of door and/or window frames by laminating the visible outer or inner sides of the frames with a plastic film, which is intended to imitate, for example, a wooden appearance, a concrete-like appearance or the like.

Furthermore, window and door frames made of PVC exist on the market, on the inner and outer sides of which an aluminum frame screen with a wall thickness of significantly more than 1 mm, in particular in the range of 1.2 mm to 3 mm, is clipped in order to give the frame a metallic look. Such a frame is attached as FIG. 1 of the present application documents and will be described in detail later. In principle, one advantage of clipping on the additional aluminum frame screen is increased UV tolerance, resulting in extended life of the plastic frame, as well as radiant heat insulation.

The disadvantage of clipping on the aluminum frame screen is the time-consuming production and installation. The aluminum screens must be cut or milled and mounted to the plastic frames with additional seals. Furthermore, a special glazing seal is required to ensure tightness between the plastic frame and the glazing when using an aluminum frame screen.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is the task of the present disclosure to overcome the disadvantages of the prior art, in particular to simplify the production of individualized profiles for window and/or door frame parts or window and/or door leaf parts.

According to this, a profile is provided for a window and/or door part, for example a door and/or window frame part or a door and/or window leaf part. The profile may be, for example, a profile made in particular of plastic, such as PVC, in particular an extrusion profile, for example a monoextrusion profile or a co-extrusion profile. Generic profiles can be produced, for example, by pultrusion or by extrusion. In the context of the present disclosure, the terms extrusion profile, monoextrusion profile or co-extrusion profile are to be understood as meaning that the corresponding profile is produced by extrusion, monoextrusion or co-extrusion, respectively.

The extrusion process may be monoextrusion or co-extrusion. The profile according to the disclosure can, for example, at least in sections form a door and/or window part, such as a bar, such as a vertical bar or a horizontal bar, either of a fixed door and/or window frame part or of a movable, in particular displaceable and/or pivotable, door and/or window leaf part. In the case where the profile is formed as a plastic extrusion profile, the profile first comprises an extrusion semi-finished product produced by extrusion, which has a substantially identical cross-section along the extrusion direction as well as a substantially identical outer dimension.

The profile according to the disclosure comprises a metal layer, in particular a metal foil, laminated by means of an adhesive at least partially onto an outer side of the profile, in particular onto a profile web forming an outer side of the profile. Suitable metals are, for example, steel, aluminum, copper or precious metals such as bronze, brass, gold, silver. The metal layer has a thickness, in particular material thickness, of less than 1.0 mm, in particular a thickness in the range from 0.05 mm to 0.5 mm. Lamination is generally understood to mean the connection of multiple layers by means of a laminating agent comprising at least one adhesive according to the present disclosure. Lamination of the thin metal layer has proven to be particularly advantageous with regard to production, since, on the one hand, the thin, flexible metal layers can be stocked in a simple and space-saving manner, for example by winding them onto a stock roll, and, on the other hand, the lamination process is surprisingly well suited even for metal layers. With regard to copper, for example, the following key figures or parameters have proved to be well suited: Basis weight of at least 100 g/m² and/or of at most 170 g/m²; tensile strength of at least 11 kg/mm², in particular of at least 25 kg/mm²; an elongation of at least 2%, in particular of at least 3%; a roughness Rz on the adhesive side of at least 5 μm and/or Ra of less than 0.43 μm; and/or a scratch resistance of at least 1.1 kg/cm.

It has also been found that when the thin metal layers of the disclosure are selected, they can be adapted and laminated to even irregular profile exteriors in a particularly form-fitting and true-to-shape manner, so that a uniform, durable and accurately fitting lamination of the corresponding profile exterior can be ensured. A further advantage is that the metal layer does not have to be exactly dimensioned in relation to the area of the outer side of the profile to be laminated, but may well be larger in size, as this can often be separated by means of simple finishing steps such as trimming. The lamination of the metal layer, as opposed to subsequent pushing on, also has the manufacturing advantage that the lamination process can be integrated directly into the extrusion process.

In an exemplary further development of the profile according to the disclosure, a connecting surface of the metal layer to be connected to the profile is at least partially coated with a bonding agent. An bonding agent, also called an adhesion primer, is generally a substance that can strengthen a close physical and/or chemical bond in the bonding area between the metal layer and the profile, which may well be based on different base materials.

In another exemplary embodiment of the present disclosure, the metal layer comprises copper, in particular the metal layer comprises copper. An outer surface of the copper metal layer, which faces a connection surface to be connected to the profile, is at least partially made of ED copper and/or is at least partially coated with copper by electroplating. ED copper is an abbreviation for "Electric Deposit" and refers to a copper lamination applied by an electroplating process, in particular galvanization, to a surface to be laminated, in this case the metal layer, which may comprise or consist of copper, for example. The bonding surface can have a roughness Rz in the range from 5 μm to 20 μm. A suitable roughness is the so-called averaged roughness depth Rz (also called ten-point height). It has been found that the use of ED copper metal layers, in particular copper foils, or in the case of electroplating a metal layer with a copper layer, the corresponding outer surface can be bonded to the profile directly with the adhesive applied to the metal layer without further use of bonding agents, such as primers, bonding agents and/or coatings. Due to its surface structure, the ED copper or the copper layer produced by electroplating forms an adhesive surface with good adhesion to the adhesive with regard to the profiles according to the disclosure, in particular those made of plastic.

The ED copper can for example be produced in a 2-stage process: deposition of base copper ("plating process"); and application of a bonding layer ("treatment process"). By means of the 2-step process, the real surface is optimally enlarged so that a particularly advantageous mechanical anchoring with the adhesive can take place for a particularly resistant bonding. In course of the galvanic deposition in the first process step, which can be carried out for example by means of cylindrical drums immersed in a sulfuric acid copper solution, the copper layer acquires a smooth side/surface and a matte, micro-rough side/surface, the so-called growth side. The rough surface is then provided with a treatment layer for the improvement of the bonding in a second electrochemical process step. The treatment layer can be generated by a multi-stage, alternating build-up and solidification deposition of metallic copper. This creates dendritic and spherical structural elements on the surface, which increase the effective surface area and thus enabled optimum anchoring of the adhesive. In metallography, dendrites are tree- or shrub-like crystal structures. In another exemplary embodiment of the present disclosure, the metal layer is formed of aluminum. An outer surface of the aluminum metal layer opposite the bonding surface of the aluminum metal layer may be at least partially coated with a bonding agent. For example, the bonding agent is the same bonding agent that is applied to the bonding surface. In this case, a layer thickness of the bonding agent applied to the outer surface opposite the connection surface can be in the range from 2 g/m² to 20 g/m²., in particular in the range from 4 g/m² to 15 g/m². In an exemplary further development, a coating layer can be applied to the exterior bonding agent layer, for example a polyester coating, an epoxy resin coating, an acrylic coating and/or a PU coating, for example with an application quantity in the range from 4 g/m² to 8 g/m². Surprisingly, it has been found that the external coating on the outer side opposite the connection surface of the aluminum metal layer gives the aluminum metal layer increased resistance to external influences, for example increased scratch resistance, as well as increased resistance to external pressure. A paint is generally a liquid or even powder coating material which is applied to the connection surface, for example sprayed on, rolled on or the like, and forms a generally continuous solid film from the surface.

The aluminum layer, in particular the aluminum foil, may be anodized. In an exemplary embodiment, the aluminum layer has a non-compacted anodized layer, which may also be referred to as an anodic oxide layer. Contrary to the common practice of densifying anodized layers, it may be advantageous for the purposes of the present disclosure to omit subsequent densification so that the anodized layer is free of subsequent densification. Thereby, the pores of the anodized layer are not closed and form a good anchoring base for the adhesive. According to a further aspect of the present disclosure, which can be combined with the preceding aspects and exemplary embodiments, a profile for a door and/or window part, in particular a door and/or window frame part or a door—and/or window leaf part, is provided. The profile may be, for example, a profile made in particular of plastic, such as PVC, in particular an extrusion profile, for example a monoextrusion profile or a co-extrusion profile. Generic profiles can be produced, for example, by pultrusion or by extrusion. The profile according to the disclosure can, for example, at least in sections form a door and/or window frame part, such as a bar, such as a vertical bar or a horizontal bar, either of a fixed door and/or window frame part or of a movable, in particular displaceable and/or pivotable, door and/or window leaf part. In the case where the profile is formed as a plastic extrusion profile, the profile first comprises an extrusion semi-finished product produced by extrusion, which has a substantially identical cross-section along the extrusion direction as well as a substantially identical outer dimension.

The profile according to the disclosure comprises a flexible, in particular thin, metal layer, in particular metal foil, laminated at least partially onto an outer side of the profile by means of an adhesive. Suitable metals include, for example, aluminum, steel, copper, and precious metals such as gold, silver, bronze, or the like. According to the disclosure, a connecting surface of the metal layer to be connected to the profile is at least partially coated with a bonding agent.

The term "bonding agent" is used here to mean a substance that creates or strengthens a close physical or chemical bond in the connection area between the metal layer and the profile, which is made, for example, of plastic and/or by means of extrusion. The flexible metal layer can be elastically stretched or bent to a certain extent, in particular in such a way that it can be easily applied to non-planar profile surfaces and adapted in shape in this respect. According to the present disclosure, a metal layer can be understood as flexible if it can be wound or rolled onto a roll, in particular for storage purposes.

In an exemplary embodiment of the present disclosure, the bonding agent comprises one- or two-component resins dissolved in a solvent such as VOC, isobutanol, xylenes or ethylbenzene, in particular epoxy resins, alkyd resins, acrylic resins and/or polyester resins. bonding agent thus composed has proved to be particularly preferred with regard to the lamination of metal layers, especially when laminating metal layers to plastic profiles, such as plastic extrusion profiles.

According to another exemplary embodiment of the profile according to the disclosure, the bonding agent is realized by a plastic film bonded to the metal layer, in particular by means of an adhesive, preferably acrylate-based, or a hot-laminated plastic film. The adhesive may comprise PUR, for example. Lamination is generally understood to mean a material-bonding thermal connection process in which preferably no further auxiliary materials are used, and in the case of hot lamination temperatures in the range from 60° C. to 80° C. can be used. The hot-laminated plastic film can, for example, have a thickness in the range from 0.01 mm to 0.08 mm, in particular in the range from 0.02 mm to 0.06 mm, and/or be made from PET, PA, PVC, PC or PI.

According to another exemplary embodiment of the profile according to the disclosure, the bonding agent is realized by a self-adhesive layer of acrylate adhesive.

According to an exemplary further development of the present disclosure, a layer thickness of the bonding agent is 2 g/m$^2$ to 20 g/m$^2$, in particular 4 g/m$^2$ to 15 g/m$^2$. In accordance with the present disclosure, it has been found that even such small amounts of bonding agent allow reliable lamination of the metal layer to the profile made, for example, of plastic.

In another exemplary embodiment of the present disclosure, a varnish is introduced between the adhesive and the bonding agent. The varnish may be, for example, a polyester varnish, epoxy resin varnish, acrylic varnish and/or PU varnish. An application amount of the varnish may, for example, be in the range of 4 g/m$^2$ to 8 g/m$^2$.

In another exemplary embodiment of the present disclosure, the adhesive is in particular a single-component hot melt adhesive, in particular PU-based. Furthermore, a layer thickness may be greater than 60 g/m$^2$. The layer thickness may further be in the range of 80 g/m$^2$ to 100/m$^2$. The adhesive may, for example, be a so-called PU hot melt. Hot melt adhesives of this type, also known as hot glues, hot adhesives or hot glues, are generally solvent-free or water-free types of adhesive that are generally solid at room temperature, are present as a viscous liquid when heated and can thus be reliably applied to an adhesive surface to be bonded, and produce a solid bond between the bonding partners with reversible solidification when cooled. These adhesive types usually comprise thermoplastic polymers.

When laminating thin, flexible metal layers onto profiles for door and/or window parts, which are made, for example, of plastic and/or by means of extrusion, the inventors of the present disclosure have identified a problem during bonding in that untreated, raw metal layers have too low a surface tension and thus the adhesion build-up to the adhesive used is insufficient for use with door and/or window parts, especially if these are arranged in the building in such a way that the metal layer faces the surroundings and is thus exposed to external environmental influences. Furthermore, it has been found that certain metals, for example aluminum, form a kind of vapor barrier that prevents the adhesive from evaporating, which has a detrimental effect on adhesion when solvent-based adhesive systems are used due to the associated hindrance to the evaporation or evaporation of the solvent of the adhesive. Furthermore, there is basically a conflict of interest between, on the one hand, the desire to laminate particularly thin metal layers, since these are particularly easy to handle, require little space and can be flexibly and easily molded to fit even irregular profile surfaces, and, on the other hand, a certain minimum thickness of the metal layer with regard to stability and resistance to external influences, such as imprints or dents and/or external influences. The measures according to the disclosure, namely the defined thickness of the metal layer in the range of less than 0.1 mm and in particular of at least 0.05 mm, and alternatively or additionally the use of a suitable bonding agent, if necessary with additional application of a coating layer, for example a polyester coating, epoxy resin coating, acrylic coating and/or PU coating, for example with an application quantity in the range of 4 g/m$^2$ to 8 g/m$^2$, in the bonding surface area between the profile and metal layer, can reliably resolve this conflict of interests in an economical manner.

According to a further aspect of the present disclosure, which can be combined with the preceding aspects and exemplary embodiments, there is provided a method for producing an extrusion profile for a door and/or window part, in particular a preferably fixed door and/or window frame part or a preferably movable door and/or window leaf part. The method may be adapted to produce a profile according to any of the exemplary embodiments or aspects of the present disclosure.

In the process according to the disclosure, an extrusion semi-finished product, for example made of plastic, such as PVC, is produced by means of extrusion, in particular by means of co-extrusion. Furthermore, in the process according to the disclosure, an adhesive, such as a one-component hotmelt adhesive, in particular PU-based and/or with a layer thickness of at least 60 g/m$^2$, in particular in the range from 80 g/m$^2$ to 100 g/m$^2$, is at least partially laminated onto an outer side of the extrusion semifinished product, a metal layer, in particular a metal foil, of less than 1.0 mm thickness, in particular with a thickness in the range from 0.05 mm to 0.5 mm.

In the case of a copper layer, in particular a copper foil, this can be made of ED copper. The above statements in this respect are transferable to the process according to the disclosure. For example, the ED copper can be produced in a 2-step process: deposition of the base copper ("plating process"); and application of a bonding layer ("treatment process"). By means of the 2-step process, an optimum enlargement of the real surface is achieved so that a particularly advantageous mechanical anchoring with the adhesive can take place for a particularly resistant bonding.

If an aluminum layer, in particular an aluminum foil, is used, this can be anodized as described above, in which case, for example, the normally usual compaction can be omitted, so that a particularly good adhesion base is formed.

According to an exemplary further development of the process according to the disclosure, a bonding surface of the metal layer to be bonded to the extrusion semifinished product is at least partially coated with a bonding agent before lamination. The bonding agent can, for example, be formed in accordance with one of the aspects mentioned above or in accordance with one of the exemplary embodiments described.

In another exemplary of the process according to the disclosure, the metal layer is preheated to a temperature of more than 60° C., in particular to a temperature in the range of 70° C. to 180° C., before being coated with the adhesive. The inventors of the present disclosure have found that the increased preheating and/or laminating temperature compared to prior art lamination processes of, for example, plastic films, results in better adhesion of the metal layer to the profile, in particular plastic extrusion profile.

According to an exemplary further development of the process according to the disclosure, the metal layer is applied to the semi-finished extrusion product by means of a laminating roll. During lamination, in particular during pressing and/or rolling of the lamination roll onto the semi-finished extrusion product, the temperature of the metal layer can be kept at more than 50° C. This is a further example of a process according to the state of the art. In this respect, too, an increased temperature compared with prior art plastic film laminations has proved to be more suitable with regard to the adhesion effect of the metal layer on the extrusion semi-finished product.

According to a further aspect of the present disclosure, which can be combined with the preceding aspects and exemplary embodiments, there is provided a method for producing an extrusion profile, in particular according to the disclosure, for a door and/or window part, in particular a preferably fixed door and/or window frame part or a preferably movable door and/or window leaf part. The method may be adapted to produce a profile according to the disclosure. In the process according to the disclosure, an extrusion semi-finished product is produced by means of extrusion, in particular by means of co-extrusion, for example from plastic. Furthermore, a flexible metal layer, in particular metal foil, is at least partially laminated onto an outer side of the extrusion semi-finished product by means of an adhesive, for example a hotmelt adhesive, in particular a single-component hotmelt adhesive, in particular PU-based, for example at a layer thickness of the adhesive of at least 60 g/m$^2$, in particular in the range from 80 g/m$^2$ to 100 g/m$^2$. According to the disclosure, a bonding surface of the metal layer to be bonded to the extrusion semifinished product is at least partially coated with an bonding agent before lamination. The bonding agent can, for example, be formed according to one of the aspects described above or exemplary embodiments and/or have a layer thickness in the range of 2 g/m$^2$, in particular in the range of 4 g/m$^2$ to 15/m$^2$.

According to a further aspect of the present disclosure, which can be combined with the preceding aspects and exemplary ones, a door and/or window part, in particular a fixed door and/or window frame part or a movable, in particular pivotable and/or displaceable, door and/or window leaf part is provided. The door and/or window part comprises a profile according to the disclosure or is produced by a manufacturing process according to the disclosure. For example, two door and/or window frame parts or door and/or window leaf parts which are perpendicular to one another and/or fastened to one another, in particular welded to one another, such as corner-welded, can form a so-called door and/or window corner part.

The present disclosure also provides a door and/or window frame and a door and/or window leaf having at least one bar made by a method according to the disclosure or formed by a profile according to the disclosure.

Figure 1:
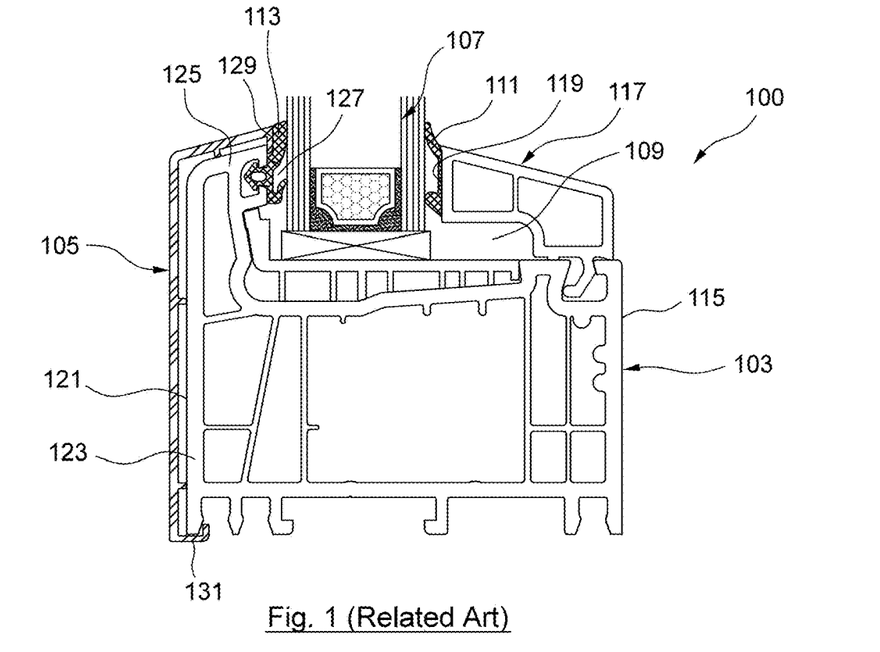
FIG. 1 a cross-sectional view of an example PVC extrusion profile with attached aluminum screen.

FIG. 1 shows a sectional view of a plastic extrusion profile, generally designated by the reference numeral 100, onto which an aluminum screen 105 is fitted on an outer side facing away from the interior of the building in order, on the one hand, to give the plastic extrusion profile an aluminum appearance and, on the other hand, to protect the plastic extrusion profile from the effects of the weather by means of the aluminum screen. A glazing 107 is inserted into a receptacle 109 and sealed off from the adjacent profile parts of the extrusion profile 100 by means of two sealing elements 111, 113 on both sides of the glazing 107. The extrusion profile 100 according to FIG. 1 has a multi-part structure and, in addition to a profile base 115, has an end profile 117 facing the interior of the building, which is connected in a form-fitting manner to the profile base 115 on the one hand and which has a sealing surface 119 to which a seal 111 is attached for sealing with respect to the glazing 107. In sectional view, the profile base 115 has a substantially L-shaped outer contour, so that towards the outer side the profile base 115 overlaps with the glazing 107, the overlap region being covered with a seal 113, the so-called glazing seal 113, in order to seal the glazing 107 on both sides. An extrusion profile outer side 121 facing away from the building interior is formed by a substantially rectilinearly extending profile outer web 123 of constant wall thickness, which merges integrally into a sealing web 125 arranged at an angle to the profile outer web 21 and extending in the direction of the glazing 107 to delimit a sealing gap 127 to be sealed.

The aluminum screen 105 is adapted to a shape of the outer profile web 123 and the sealing web 125, so that the aluminum screen 105 completely covers the extruded plastic profile 103 toward the outer side. In the area of the glazing 107, the sealing gap 127 is formed between an angled end portion 129 of the aluminum screen 105 and the planar extension of the glazing 107. In this area, a glazing seal 113 specially formed for the extruded profile 103 is inserted. Compared to plastic extrusion profiles without aluminum screen 105, glazing seal 113 has been modified to seal the resulting different sealing gap dimension 127.

At the other end 131 of the aluminum screen 105, the aluminum screen 105 has an end portion that is U-shaped in cross-section and is so disposed around one end of the outer profile web 123. Through the angled ends 129, 131, the aluminum screen 105 is positively attached to the plastic extrusion profile 103, namely pushed on and clipped on.

Figure 2:
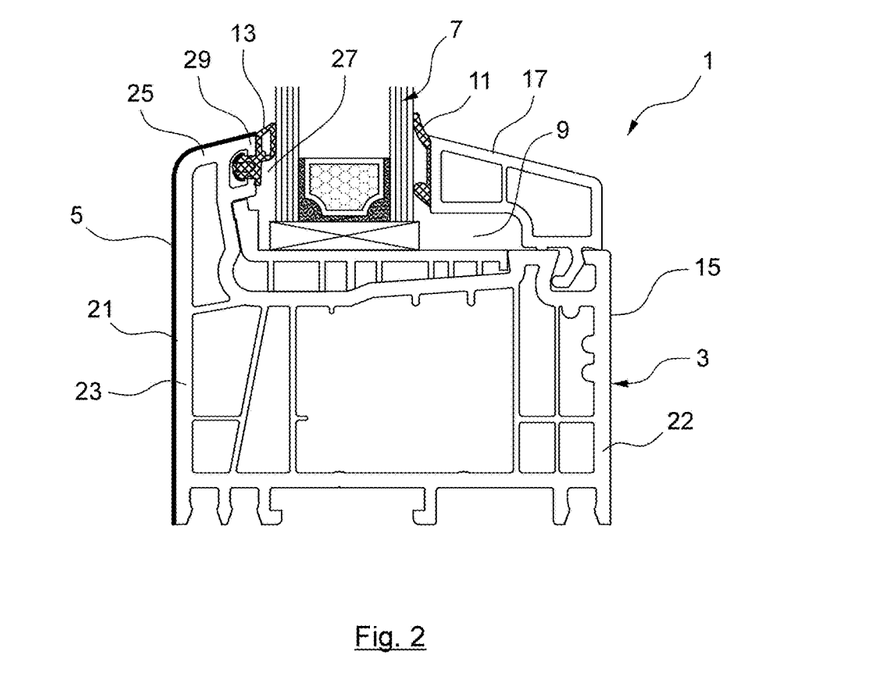
FIG. 2 a profile according to an exemplary embodiment of the disclosure in sectional view.

With reference to FIG. 2, an embodiment of a profile according to the disclosure, generally provided with reference numeral 1, is described. In the exemplary embodiments of profiles 1 according to the disclosure of FIGS. 2 to 5, the profiles in question are, by way of example, extrusion profiles 1 made of plastic, in particular PVC, which are produced by means of extrusion. The extrusion can be carried out by means of mono-extrusion or co-extrusion. The profile 1 may include, a glazing 7 that is inserted into a receptacle 9 and sealed off from the adjacent profile parts of the extrusion profile 1 by means of two sealing elements 11, 13 on both sides of the glazing 07. The extrusion profile 1 according to FIG. 2 may have a multi-part structure and, in addition to a profile base 15, has an end profile 17 facing the interior of the building, which is connected in a form-fitting manner to the profile base 15 on the one hand and which has a sealing surface 19 to which a seal 11 is attached for sealing with respect to the glazing 7. In sectional view, the profile base 15 has a substantially L-shaped outer contour, so that towards the outer side the profile base 15 overlaps with the glazing 7, the overlap region being covered with a seal 13, the so-called glazing seal 13, in order to seal the glazing 7 on both sides. An extrusion profile outer side 21 facing away from the building interior is formed by a substantially rectilinearly extending profile outer web 23 of constant wall thickness, which merges integrally into a sealing web 25 arranged at an angle to the profile outer web 21 and extending in the direction of the glazing 7 to delimit a sealing gap 27 to be sealed. As illustrated in FIG. 2, the extrusion profile 1 may include metal layer 5 disposed on the outer profile web 23, as discussed in more detail below.

In contrast to the attached and latched aluminum screen 105, the metal layer 5, such as a metal foil, of less than 0.8 mm thickness, which is constant along its longitudinal extent and can be flexible due to its thin dimensions, is laminated onto the outer profile web 23 facing away from the building interior. It is clear that the metal layer 5 can also be laminated to an inner profile web 22 opposite the outer profile web 23, or that this can be additionally laminated with a metal layer 5 in order to give the extrusion profile 3 a metal appearance on the inside as well. The manufacturing process will be discussed in detail later. The advantage of laminating the metal layer 5 is in particular that, on the one hand, the metal layer 5 lies directly on the extrusion profile 1, so that a particularly compact structure is provided. Furthermore, the metal layer 5 can be dimensioned such that it substantially exclusively covers the visible area of the corresponding profile webs 23, 22 of the extrusion profile 3. It is not necessary for the metal layer 5 to project into the sealing gap 27, for example in the area of the glazing, for example in order to ensure fastening as is the case with the aluminum screen 105. The same applies to the other end of the outer profile web 23, which the metal layer 5 does not have to encompass. In the area of the glazing 7, this has a particularly advantageous effect, since recourse can be had to the standard glazing seals 13, so that no separate fabrications are necessary for the glazing seal 113 as in the case of the use of the aluminum screen 105. The fastening by means of lamination is significantly stronger and thus more durable than with the prior art clipping.

Figure 3:
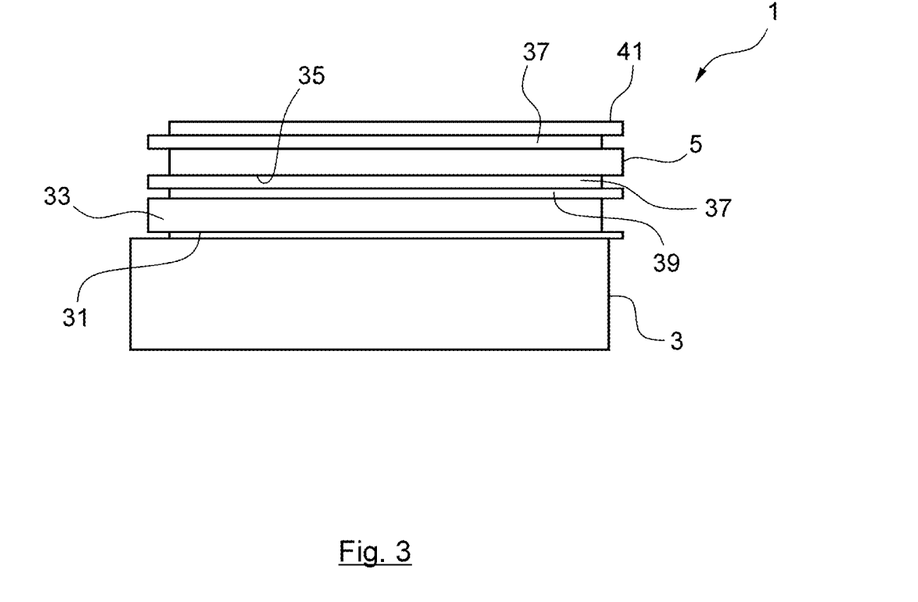
FIG. 3 a schematic representation of a further exemplary embodiment of a connection area of a profile according to the disclosure.
Figure 4:
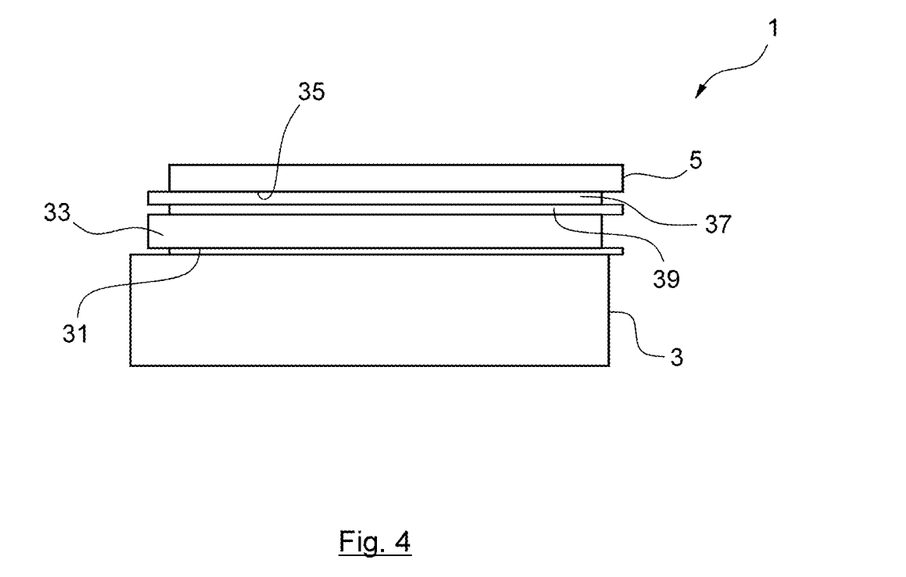
FIG. 4 a schematic representation of a further exemplary embodiment of a connection region of a profile according to the disclosure.

FIGS. 3 to 4 show exemplary schematic sections of extrusion profiles 1 according to the disclosure, with the connection area between metal layer 5 significantly enlarged and shown schematically. The resulting layer structure is now described in each case starting from the bottom upwards. A so-called primer 31 is first applied to the plastic extrusion profile 3, which ensures particularly good adhesion of the subsequent adhesive 33. It is essential to the disclosure that the metal layer 5 is at least partially coated with a bonding agent 37 at least on the connection surface 35 facing the plastic extrusion profile 3. In FIG. 3, it can additionally be seen that an optional varnish 39, such as a topcoat or a clear varnish, can be introduced between the bonding agent 37 and the adhesive layer 33. For some metal layers 5, it has been found that it may be necessary to coat both sides of the metal layer 5 with a bonding agent 37. For example, this may be necessary for aluminum. In addition, a varnish 41, such as a topcoat or a clear varnish or a color-imparting varnish, may again optionally be applied to the outer side adhesion primer layer 37.

In the examples of the extrusion profile 1 according to the disclosure shown schematically in FIG. 4, the metal layer 5 selected is a metal, such as copper, for which it is not necessary to also apply an external adhesive base layer 37. The connection area between the plastic extrusion profile 3 and the metal layer 5 is implemented in the same way as in FIG. 3, although the coating layer 39 is also optional here.

Figure 5:
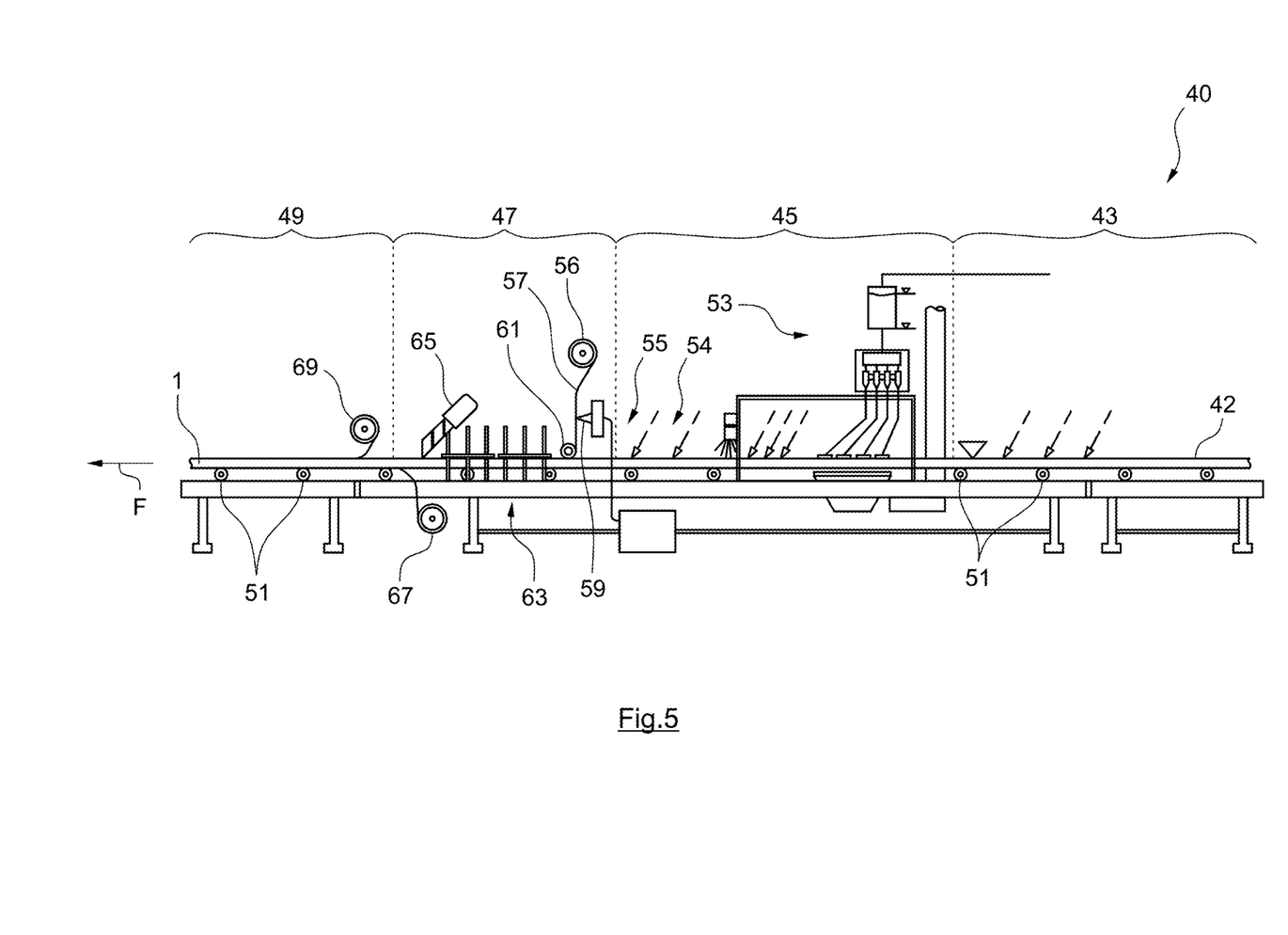
FIG. 5 a schematic representation of a section of a manufacturing plant for a profile according to an exemplary embodiment of the disclosure.

With reference to FIG. 5, the manufacturing process for producing an extrusion profile 1 according to the disclosure and, in particular, for laminating metal layers 5 is shown schematically and is explained in more detail below: FIG. 5 shows a section of a production line 40 for producing an extrusion profile 1 according to the disclosure, into which an extrusion semi-finished product 42 produced by an extrusion die (not shown) is conveyed (from the right in the figure).

Basically, the laminating line 40 is divided into the following stations: infeed area 43, primer area 45, transfer area 47 and outfeed area 49. Basically, the extrusion semi-finished product 42 and the later finished extrusion profile 1 are conveyed through the laminating line 40 by means of a plurality of conveying rollers 51 in the longitudinal direction of the extrusion profile according to a conveying direction F. In the inlet area 43, the extrusion semi-finished product 42 is substantially delivered with a profile temperature in the range of 18° C. to 25° C. In the primer area 45, there is a primer station 53 for applying the primer evenly and over the entire surface of the extrusion profile side to be laminated with the metal layer 5, which can be, for example, an inner or an outer side 22, 23 of the finished window or door. An application and drying section 54 for the primer is provided between the primer area 45 and the transfer area 47.

In the transfer area 47, the layer to be laminated, in particular metal layer 5, is mounted like a metal foil on a roller 56. A strand 57 of the metal layer 5 to be laminated is then continuously unwound from the roller 46 essentially synchronously and/or coordinated with the conveying F of the semi-finished extrusion product 42 and coated on one side on a laminating surface with adhesive, which is applied by means of a nozzle 59 upstream of a laminating roller 61, which presses the metal layer 5 onto the plastic extrusion profile 3.

In contrast to prior art PVC film lamination onto plastic extrusion profiles, it was found according to the disclosure that the amount of adhesive must be significantly increased and, in particular, adhesive amounts in the range of 80 g/m$^2$ are necessary. Furthermore, preheating of the metal layer 5 takes place in the area of adhesive application, and it has also been found in accordance with the disclosure that significantly higher temperatures are necessary here, for example in the range from 90° C. to 125° C. For good adhesion, it has been identified that a temperature of at least 65° C. must be maintained in the region of the laminating roller 61. Optionally, a hot air blower or other heat air generator 63 can be connected to the laminating roller 61.

Trimming can be carried out by means of a separation device 65. Subsequently, in particular in the area of the profile outlet 49, a further application of protective films can take place, which are provided by respective rollers 67, 69 and are applied to the upper and lower sides 22, 23 of the extrusion profile 1 according to the disclosure. This can be done by an adhesive applied to the protective films.

Figure 6:
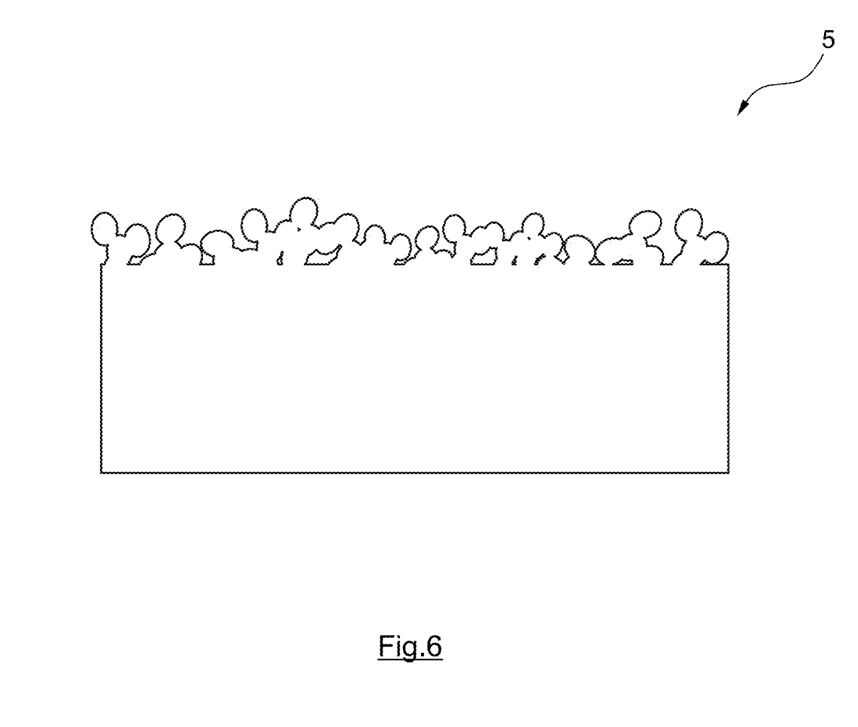
FIG. 6 a schematic representation of a surface of a copper layer of a profile according to an exemplary embodiment of the disclosure The exemplary embodiments of the present disclosure will be described with reference to the accompanying drawings. Elements, features and components that are identical, functionally identical and have the same effect are—insofar as is not stated otherwise—respectively provided with the same reference character.

FIG. 6 shows a schematic principle sketch of a sectional view through a copper foil 5 made of ED copper, which was produced using the 2-step process described above. The "treatment layer" of dentritic and spherical structural elements produced in the second process step can be seen on the upper side. The tree- or shrub-like branching structures provide an advantageous enlargement of the surface and an optimal anchoring structure for the adhesive (not shown). For example, the copper foil 5 has a thickness of about 200 µm. The features disclosed in the foregoing description, figures, and claims may be significant, both individually and in any combination, for the realization of the disclosure in the various embodiments.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment." "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 profile
3 profile semi-finished product
5 metal layer
7 glazing
9 receptacle
11, 13 glazing seal
15 profile base
17 screen profile
19 sealing surface
21 profile outer side
23 profile outer web
25 sealing bar
27 sealing gap
29, 31 end
33 adhesive
35 connection surface
37 bonding agent
39, 41 varnish
42 extrusion semi-finished product
43 inlet area
45 primer area
47 transfer area
49 outlet area
51 conveyor roller
53 primer station
54 impact and dry section
56 roller
57 strand
59 nozzle
61 laminating roller
63 heat air generator
65 separation device
67, 69 roller
100 plastic extrusion profile
103 extrusion semi-finished product
105 aluminum screen
107 glazing
109 receptacle
111, 113 sealing element
115 profile base
117 screen profile
119 scaling surface
121 extrusion profile exterior
123 profile outer web
125 scaling web
127 scaling gap
129, 131 end

The invention claimed is:

1. An extrusion profile for a door and/or window part, comprising:
   an outer side; and
   a metal layer including an outer surface and a connecting surface opposite the outer surface, the metal layer having a thickness from 0.05 mm to 0.5 mm and being laminated at least partially onto the outer side of the extrusion profile using an adhesive, wherein: the metal layer comprises copper; the connecting surface is configured to connect to the extrusion profile; and the outer surface at least partially includes Electric Deposit (ED) copper and/or is at least partially coated with copper by electroplating.

2. The profile according to claim 1, wherein the connecting surface is at least partially coated with a bonding agent.

3. The profile according to claim 1, wherein:
   the connecting surface has a roughness in the range from 5 µm to 20 µm, and
   the copper metal layer comprises dendritic and spherical structural elements.

4. The profile according to claim 1, wherein the adhesive is a single-component hotmelt adhesive based on Polyurethane (PU), and/or has a layer thickness from 80 g/m$^2$ to 100 g/m$^2$.

5. The profile according to claim 1, wherein the copper metal layer comprises dendritic and spherical structural elements.

6. The profile according to claim 5, wherein the dendritic and spherical structural elements are formed on the connecting surface.

7. The profile according to claim 1, wherein the connecting surface has a roughness in the range from 5 μm to 20 μm.

8. An extrusion profile for a door and/or window part, comprising:
 an outer side surface; and
 a flexible metal layer laminatable at least partially onto the outer side surface of the profile by an adhesive, the flexible metal layer including an outer surface and a connecting surface opposite the outer surface, the connecting surface being connectable to the profile being coated at least partially with a bonding agent, wherein the flexible metal layer comprises copper, the outer surface at least partially including Electric Deposit (ED) copper and/or is at least partially coated with copper by electroplating.

9. The profile according to claim 8, wherein the bonding agent comprises a two-component resin that includes an epoxy resin, alkyd resin, acrylic resin and/or polyester resin, dissolved in a solvent that includes a volatile organic compound (VOC), isobutanol, xylene or ethylbenzene.

10. The profile according to claim 8, wherein the bonding agent is a plastic film glued onto the metal layer by the adhesive, wherein the adhesive is an acrylate adhesive, a hot-laminated adhesive, or a Polyurethane reactive (PUR) adhesive, wherein the plastic film has a thickness of 0.01 mm to 0.08 mm, and/or is made of Polyethylene Terephthalate (PET), Polyamide (PA), Polyvinyl Chloride (PVC), Polycarbonate (PC) or Polyimide (PI).

11. The profile according to claim 8, wherein:
 the bonding agent is a self-adhesive layer of acrylate adhesive,
 a layer thickness of the bonding agent is 2 g/m$^2$ to 20 g/m$^2$, and/or
 further comprising a varnish introduced between the adhesive and the bonding agent, the varnish including a polyester varnish, epoxy resin varnish, acrylic varnish and/or Polyurethane (PU) varnish, and the varnish is applied with an application quantity of 4 g/m$^2$ to 8 g/m$^2$.

12. A method for producing an extrusion profile for a door and/or window part to produce a semi-finished extrusion product, the method comprising:
 extruding an extrusion material to produce the semi-finished extrusion product; and
 laminating a metal layer having a thickness of less than 1.0 mm at least partially onto an outer side of the semi-finished extrusion product using an adhesive, wherein the metal layer comprises copper, an outer surface of the copper metal layer opposite a connecting surface of the copper metal layer configured to connect to the extrusion profile at least partially includes Electric Deposit (ED) copper and/or is at least partially coated with copper by electroplating.

13. The method according to claim 12, wherein the connection surface of the metal layer to be joined to the extrusion semi-finished product is at least partially coated with a bonding agent prior to lamination.

14. The method according to claim 12, wherein the metal layer is preheated to a temperature of 70° C. to 180° C. before coating with the adhesive.

15. The method according to claim 12, wherein the metal layer is applied to the extrusion semi-finished product using a laminating roll, a temperature of the metal layer being kept at more than 50° C. during laminating.

16. The method according to claim 12, wherein the copper metal layer is treated to provide dendritic and spherical structural elements.

17. A method for producing an extrusion profile for a door and/or window part to produce an extrusion semi-finished product, comprising:
 extruding an extrusion material to produce the extrusion semi-finished extrusion product; and
 laminating a flexible metal layer including a metal foil at least partially onto an outer side of the extrusion semi-finished product using an adhesive, a connecting surface of the metal layer connectable to the extrusion semi-finished product being at least partially coated with a bonding agent before the lamination, wherein the metal layer comprises copper, an outer surface of the copper metal layer opposite the connecting surface at least partially includes Electric Deposit (ED) copper and/or is at least partially coated with copper by electroplating.

18. A door and/or window part, comprising:
 an extrusion product including an outer side and a metal layer, wherein the metal layer comprises copper, has a thickness from 0.05 mm to 0.5 mm, and is laminatable at least partially onto the outer side of the extrusion product using an adhesive, wherein an outer surface of the copper metal layer opposite a connecting surface of the copper metal layer configured to connect to the extrusion product at least partially includes Electric Deposit (ED) copper and/or is at least partially coated with copper by electroplating.

19. The door and/or window part according to claim 18, wherein the door and/or window part is a door and/or window frame part or is door and/or window leaf part.

* * * * *